J. T. Hancock.

Steam-Boiler Furnace.

No. 2835 Reissued Jan. 14, 1868.

Witnesses
Albert H. Brown
Jno. M. Woodward

Inventor.
John T. Hancock
by his Att'y
Joseph Garrett

United States Patent Office.

JOHN T. HANCOCK, OF BOSTON, MASSACHUSETTS.

*Letters Patent No.* 41,770, *dated March* 1, 1864; *reissue No.* 2,835, *dated January* 14, 1868.

IMPROVEMENT IN STEAM-BOILER FURNACES.

The Schedule referred to in these Letters Patent and making part of the same.

TO ALL PERSONS TO WHOM THESE PRESENTS SHALL COME:

Be it known that I, JOHN T. HANCOCK, of Boston, in the county of Suffolk, and State of Massachusetts, have invented certain new and useful Improvements in Steam-Blowers; and that the following description, taken in connection with the accompanying plate of drawings, hereinafter referred to, forms a full and exact specification of the same, wherein I have set forth the nature and principles of my said improvements, whereby my invention may be distinguished from all others of a similar class, together with such parts as I claim, and desire to have secured to me by Letters Patent.

The primary object of this invention is the production of a warm, moist, and constant blast for increasing the energy of furnace-fires, and for contributing to the perfect combustion and economy of the fuel. Its secondary objects are the ventilation of buildings, ships, and mines, and the promoting of the evaporating of liquids.

It has long been known to that portion of the manufacturing community whose business requires the aid of fires of great intensity, that, with the same amount of natural or artificial draught, and with equal care in firing, there is, at particular times, a material diminution in the amount of work usually performed by the same quantity of fuel, arising from some peculiarity in the air supplied to the fire.

It has been observed that, at such times, the presence of moisture in limited quantities in the ash-pit has a tendency to cause the fires to burn more clearly, and also for the time to yield a greater relative amount of heat. The source of such moisture has been either the wetting of the ashes in the pit, or the introduction of a steam-pipe into the ash-pit. But, excepting as a mere experiment, resort is seldom had to such expedients, for the unequal diffusion of the moisture throughout the ash-pit, and the difficulty of regulating its proper proportion, usually result in extinguishing the fire on some part of the grate, or proves to be at best of doubtful utility.

Experiments made by me have demonstrated that, by closing the ash-pit, and forcibly introducing therein, by means of the ordinary fan-blowing apparatus, air saturated with the moisture from steam, not only was the energy of the combustion increased, but a greater quantity of heat from the same amount of fuel was obtained, less clinker was formed, and, when properly applied, very little or no smoke was produced. Further experiments resulted in the devising of a more simple and useful apparatus, wherewith the air was saturated with the required amount of moisture, and at the same time continuously forced towards and into the fire by means of the direct action of steam upon a column of air.

This apparatus, to enable others skilled in the art to make and use, I will describe, by reference to the following description thereof, and to the accompanying drawings, making a part of this specification, in which—

The same letters refer to the same parts in each of the figures.

Figure 1:
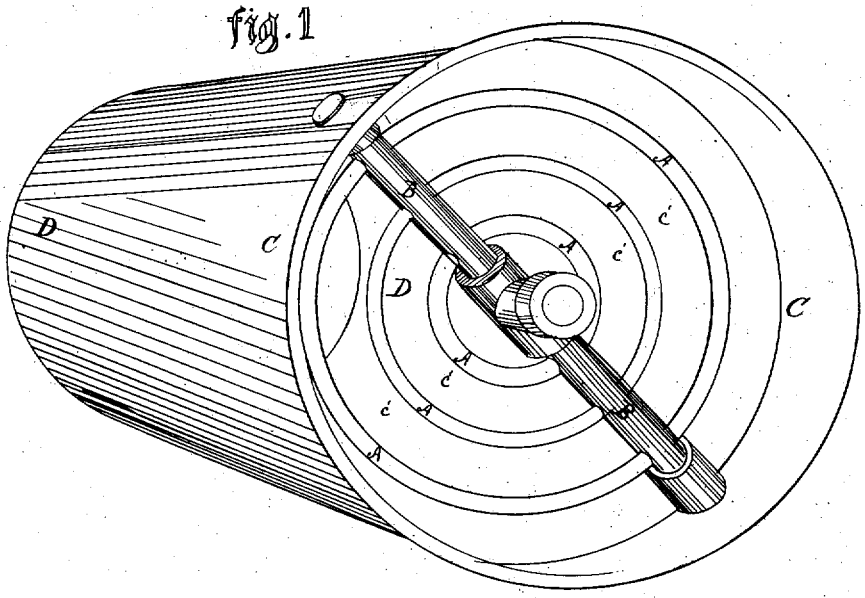
Figure 1 is a perspective view of the apparatus complete.
Figure 2:
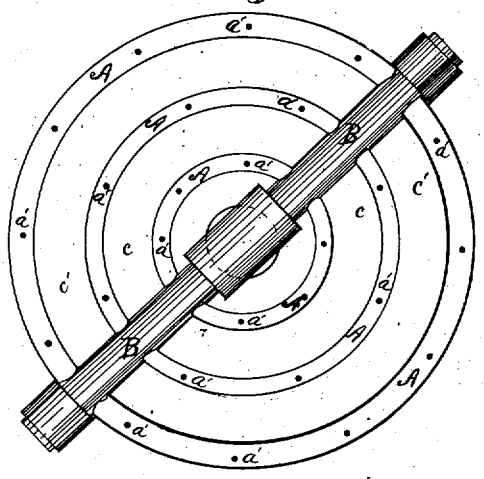
Figure 2 is a detached elevation of the steam-pipes, with their perforations towards the observer.

A A, &c., are a series of pipes, perforated with small holes or openings, *a' a' a'*, &c., and connected, by any suitable means, with a main steam-pipe, B. This series of perforated tubes is affixed within the conical tube or chamber C D, at or near its base, C, with the orifice in the pipe towards the end D. *b* is the opening in pipe B, through which steam from a boiler is allowed to enter.

When this apparatus has been connected with a furnace, either by inserting it in the wall of the ash-pit, with the base of the cone outward, or in any more convenient position, and a pipe from a steam-boiler connected with the main pipe at *b*, upon closing the door of the ash-pit, and then allowing the steam to flow through the orifices *a' a' a'*, &c., into the tube or chamber C D, a continuous current of air will immediately enter the tube or chamber C D through the intervals *c c'*, &c., between the perforated pipes A A, &c., which air is instantly saturated with steam, and forced onward and into the fire by the steam from the jets *a' a' a'*, &c. The greater the pressure of the steam at the jets the greater will be the quantity of air forced into the fire, and, if the outlet of the furnace remains of the same area, the greater will be the pressure in the ash-pit. The tube C D is contracted at its outlet, for the purpose of retaining the air and steam in contact for a longer period than would be the case if the tube were of a constant area, but, when by circumstances this tube is necessarily prolonged to an extent of three or more diameters, such contraction may be dispensed with without materially affecting the usefulness of the apparatus.

The object of the small outlets *a' a' a'* is to economize the steam, as the draught through the intervals between the pipes depends upon the periphery of the jet and not upon its area, and to furnish the proper proportion of it to the air. If they are made too large or too numerous in the pipe, too much steam will be supplied in proportion to the air, which will be fatal to the objects of this invention. I have found in practice that from sixty to eighty holes, one thirty-second of an inch in diameter, for every square foot of surface at the plane of the tubes in the blower, furnished satisfactory results.

It is not necessary that the perforated tubes be arranged as shown in the drawings, viz, as concentric circles, nor is it necessary that the section of the chamber C D be circular, or that it be formed of metal, for so long as the principle requires that there shall be intervals between the jets for the admission of air, and a chamber between the jet plane and the point where the moist air is delivered, the jets can be arranged in such form as fancy or circumstances may dictate, while the chamber C D must conform in section to the arrangement of the jets. A rectangular section of chamber and the pipes disposed in parallel lines is a good form for general practice. In some cases it may be useful to have the axis of the tubes parallel with that of the chamber, and the perforations in the ends insteads of the sides.

When this apparatus is used for ventilation, the foul air must of course be drawn into the blower and then discharged therefrom into the open air, or otherwise disposed of. The principle upon which this apparatus acts is as follows: The steam, as it issues from the several jets, drives forward all the air immediately in front of them, while the air which surrounds the jets partially condenses the steam, and in return is expanded by the heat, and then thrown forward loaded with moisture by the succeeding steam, leaving a partial vacuum, into which, the momentum of the steam being too great before condensation to allow it to deviate from its course, the external air rushes from between the pipes, to be in turn expanded and driven forward. The hotter the steam the greater will be the amount of the vacuum, and consequently the more rapid will be the rush of the external air to fill it, while the greater the pressure of the steam the greater will be the pressure in the ash-pit.

The theory of the more perfect combustion, which I have found invariably to result from the proper use of this apparatus in practice, I will now attempt to give, premising that a more extensive experience may essentially modify it.

When the warm and moist blast is brought forcibly into contact with the incandescent fuel, the carbon of the fuel in the lower stratum combines with the oxygen of the water, forming carbonic acid, and the nitrogen of the air combining with the hydrogen of the fuel forms ammonia. The hydrogen of the water and the oxygen of the air being thus released, instantly unite to form water, and the resultant intense heat causes the combustion of the succeeding strata above to become more energetic, the carbon of which absorbs a portion of the ascending acid, converting it into carbonic oxide, which, combining with the undecomposed air which has passed upward through the fuel, is again converted into acid. By properly proportioning the relative quantities of air and moisture, nearly perfect combustion and consequent economy of fuel can be obtained.

Having thus fully described my invention, I will again call attention to the essential difference between this invention and those which have been made by others for a similar purpose.

In all previous methods of applying steam to fire, the steam has been admitted into the ash-pit from a pipe, to the area of the outlet of which little or no attention has been paid, and where such pipe has been perforated, for the purpose of more equally distributing the steam in the pit, no provision has been made whereby the fresh air, on entering the pit, could have immediate and free access to each and all of the jets. The consequence of this neglect has been that, while one portion of the fire was supplied with the proper amount of steam and air, another part has a surplus of steam, and the remainder no steam at all. Again, there has been no plan heretofore adopted whereby the steam should be thoroughly mixed with the air previous to its being allowed to enter the ash-pit, nor has such mixture been supposed necessary.

Now, in this invention, the steam is equally distributed over the area of the entrance of a chamber in numerous small jets, instead of pipes of comparatively large area, and each of these jets is so placed that the surface of the issuing steam is in contact with the entering air. (A perforated disk similar to the nose of a watering-pot will not answer the purpose, for the air cannot have free access to the more central jets.) Finally, the air and steam must be and are thoroughly mixed before they are allowed to enter the space below the fire.

Having thus described my improvements, I shall state my claim as follows:

I do not claim as my invention all methods of introducing steam into the ash-pit of furnaces; but What I do claim as my invention, is—

The method of supplying air and steam to ignited fuel in furnaces, by commingling and then introducing them into an enclosed space under the grate-bars, by means substantially as above described.

JOHN T. HANCOCK.

Witnesses:

JOSEPH GAVETT,

SAM'L M. BARTON.